US008555171B2

(12) United States Patent
Kuo et al.

(10) Patent No.: US 8,555,171 B2
(45) Date of Patent: Oct. 8, 2013

(54) PORTABLE VIRTUAL HUMAN-MACHINE INTERACTION DEVICE AND OPERATION METHOD THEREOF

(75) Inventors: Ching-Yi Kuo, Kaohsiung (TW);
Chun-Liang Chien, Taoyuan County (TW); Cheng-Hua Wu, Hsinchu County (TW); Chun-Wei Chen, Taichung County (TW); Yu-Kuen Tsai, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 305 days.

(21) Appl. No.: 12/959,382

(22) Filed: Dec. 3, 2010

(65) Prior Publication Data

US 2011/0138285 A1    Jun. 9, 2011

(30) Foreign Application Priority Data

Dec. 9, 2009  (TW) ............... 98142152 A
Oct. 20, 2010  (TW) ............... 99135780 A

(51) Int. Cl.
*G06F 3/16* (2006.01)
*G06F 15/16* (2006.01)

(52) U.S. Cl.
USPC .......................... 715/727; 709/231

(58) Field of Classification Search
USPC .......................... 715/727; 709/231
See application file for complete search history.

(56) References Cited

U.S. PATENT DOCUMENTS

| 6,996,460 | B1 | 2/2006 | Krahnstoever et al. | |
|---|---|---|---|---|
| 8,253,746 | B2 * | 8/2012 | Geisner et al. | 345/474 |
| 2008/0055194 | A1 * | 3/2008 | Baudino et al. | 345/8 |
| 2008/0100570 | A1 * | 5/2008 | Friedrich et al. | 345/156 |
| 2008/0136775 | A1 * | 6/2008 | Conant | 345/156 |
| 2009/0012531 | A1 * | 1/2009 | Quaid et al. | 606/130 |
| 2010/0156836 | A1 | 6/2010 | Katayama | |

(Continued)

FOREIGN PATENT DOCUMENTS

| DE | 10056291 | 5/2002 |
|---|---|---|
| TW | 200601121 | 1/2006 |

(Continued)

OTHER PUBLICATIONS

"Office Action of Taiwan Counterpart Application", issued on Jul. 30, 2013, p1-p9, in which the listed references were cited.

*Primary Examiner* — David Phantana Angkool
(74) *Attorney, Agent, or Firm* — Jianq Chyun IP Office

(57) ABSTRACT

A portable virtual input control device and a method thereof are provided, which can achieve a purpose of human-machine interaction and remote control. The portable virtual input control device comprises a main body, an operation interface display unit connected to the main body, an image capturing module adjacent to the main body, and a central processing module, built in the main body. The operation interface display unit is movably disposed in front of a head of the user for displaying an operation interface corresponding to a controlled device. The image capturing module captures a position image of a hand of the user outside the operation interface display unit. The central processing module transmits display data to the operation interface display unit to display the operation interface, and connected to the image capturing module for receiving the position image of the hand of the user captured by the image capturing module, and determining a control command input by the user according to the display data and the position image of the hand of the user.

21 Claims, 21 Drawing Sheets

(56) References Cited

U.S. PATENT DOCUMENTS

| | | | |
|---|---|---|---|
| 2010/0275122 A1* | 10/2010 | Buxton et al. | 715/728 |
| 2011/0221669 A1* | 9/2011 | Shams et al. | 345/156 |
| 2011/0222745 A1* | 9/2011 | Osterhout et al. | 382/118 |
| 2011/0225536 A1* | 9/2011 | Shams et al. | 715/773 |
| 2011/0227812 A1* | 9/2011 | Haddick et al. | 345/8 |
| 2011/0227813 A1* | 9/2011 | Haddick et al. | 345/8 |
| 2011/0227820 A1* | 9/2011 | Haddick et al. | 345/156 |
| 2011/0231757 A1* | 9/2011 | Haddick et al. | 715/702 |
| 2012/0062445 A1* | 3/2012 | Haddick et al. | 345/8 |
| 2012/0102438 A1* | 4/2012 | Robinson et al. | 715/863 |
| 2012/0102439 A1* | 4/2012 | Mitchell et al. | 715/863 |
| 2012/0249588 A1* | 10/2012 | Tison et al. | 345/633 |

FOREIGN PATENT DOCUMENTS

| | | |
|---|---|---|
| TW | I284461 | 7/2007 |
| TW | 200837713 | 9/2008 |
| WO | 9637798 | 11/1996 |
| WO | 0178052 | 10/2001 |

* cited by examiner

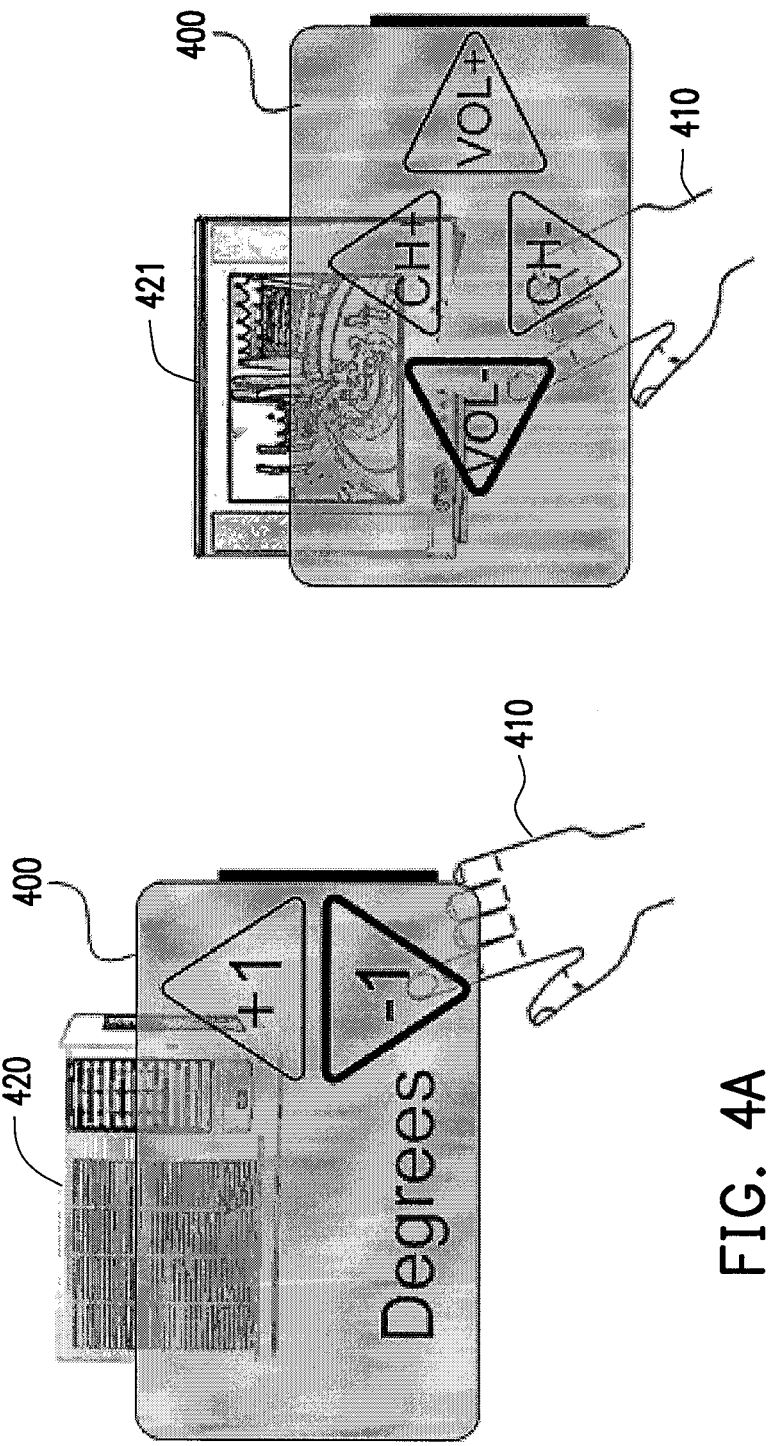

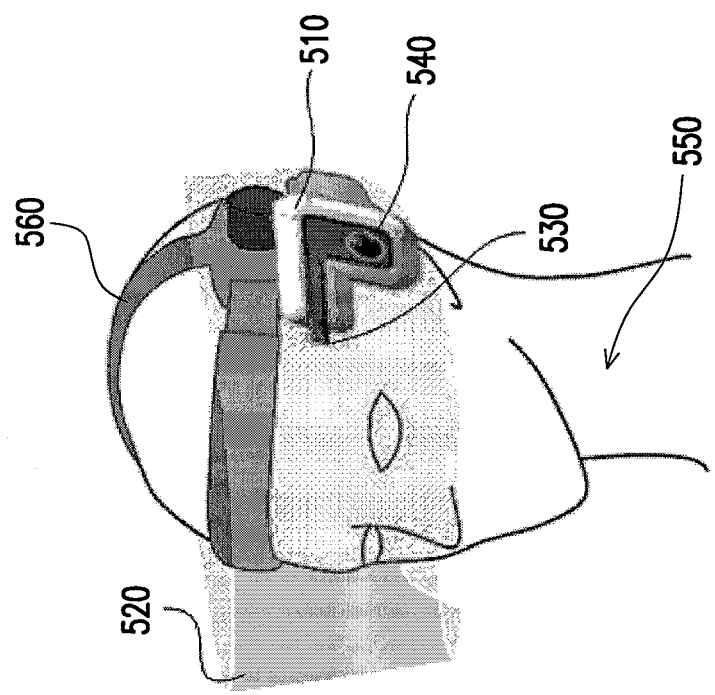
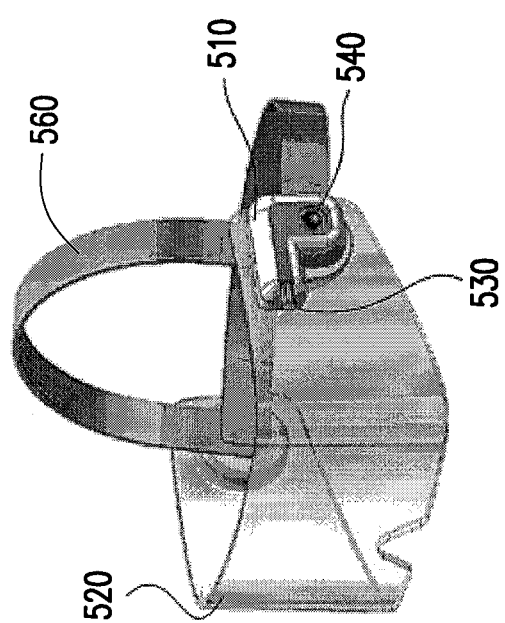
FIG. 5B
FIG. 5A

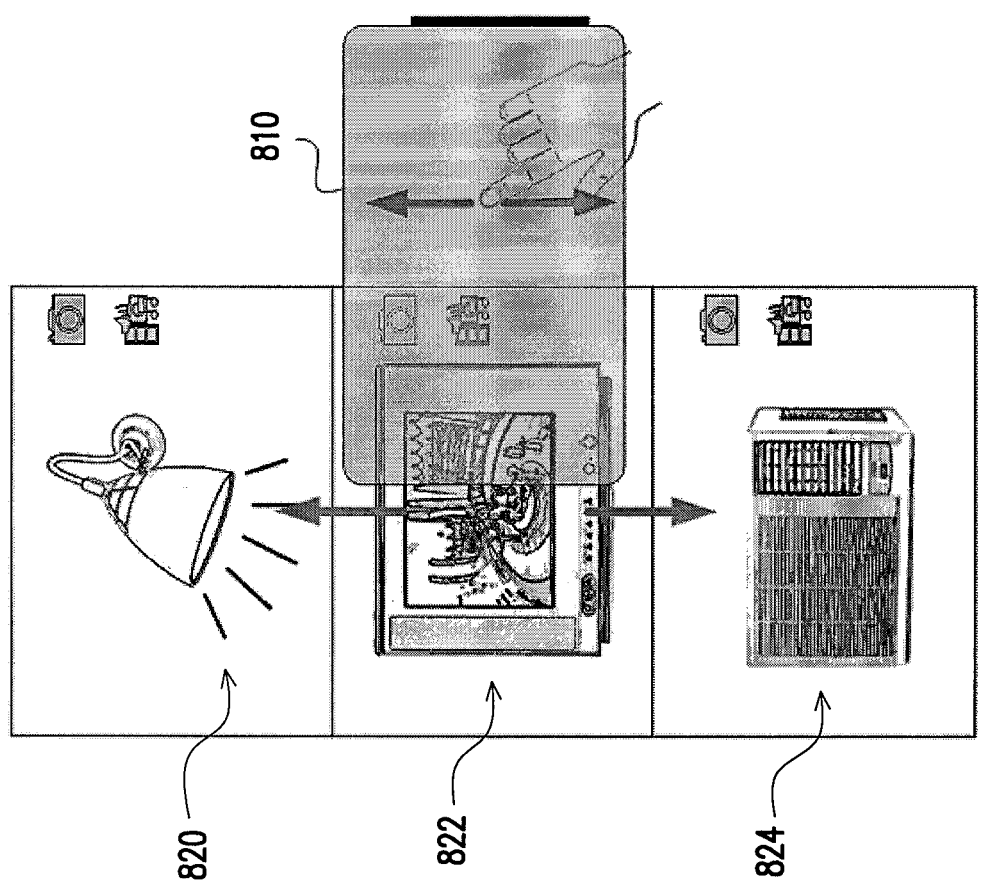

PORTABLE VIRTUAL HUMAN-MACHINE INTERACTION DEVICE AND OPERATION METHOD THEREOF

CROSS-REFERENCE TO RELATED APPLICATION

This application claims the priority benefits of Taiwan application serial no. 98142152, filed on Dec. 9, 2009 and Taiwan application serial no. 99135780, filed on Oct. 20, 2010. The entirety of each of the above-mentioned patent applications is hereby incorporated by reference herein and made a part of this specification.

BACKGROUND

1. Field of the Disclosure

The disclosure relates to a portable virtual human-machine interaction device and an operation method thereof.

2. Description of Related Art

A user interface facilitates a user to operate a device or to perform information exchanged through a convenient interface, so as to achieve a convenient human-machine interaction effect. For example, through a steering wheel, a gear stick, a gas pedal, a brake pedal and a dashboard of a vehicle, people can drive and control the vehicle, and get to know a state (speed, amount of remained oil and engine temperature, etc.) of the vehicle. Nowadays, many applications of consumable electronic products are developed for considering user-friendly operations, for example, graphics interfaces such as Microsoft Windows operating system. Most technologies is developed to meet human needs, so that more and more developments and researches are conducted in order to improve the operation interface, which includes simplifying the interface, making the operation interface to be more intuitive in operation, or enabling an input prompt and reducing operation errors through the interface design, etc.

Most user-friendly graphics interface require a physical operation device to implement operation and control, for example, a keyboard and a mouse of a computer, keys of a mobile phone or operation keys on any electronic device. Other implementation is user interface is touch screen which is also very convenient for operation and generally used in handheld electronic devices, such as a digital mobile phone, a personal digital assistant (PDA), a global positioning system (GPS) device for satellite navigation, etc. However, in such applications, besides sometimes requiring an additional stylus (or referred to as a handwriting pen), the electronic device itself is a physical operation controller, and a unique feature thereof is only that a virtual operation device (keys, or graphics interfaces, etc.) and display formation are displayed on a same screen window.

In all of the aforementioned applications, the user sends an operation control command through a control device, so as to implement operation through control activities between the user and the interface.

SUMMARY OF THE DISCLOSURE

The disclosure provides a portable virtual input control device, which is adapted to be hanged on a user's body. The portable virtual input control device includes a main body, an operation interface display unit, an image capturing module, a central processing module and a wireless transmission module. The interface display unit is connected to the main body, and is movably disposed in front of a head of the user for displaying an operation interface corresponding to a controlled device. The image capturing module is disposed on the main body for capturing a position image of a hand of the user. The central processing module is built in the main body, which is used for transmitting display data to the operation interface display unit to display the operation interface, and is connected to the image capturing module for receiving the image with the position information of the hand of the user which is captured by the image capturing module. Thus, control command is determined by input by the user according to the relationship of display data and the position image of the hand of the user.

The disclosure provides an operation method adapted to a portable virtual input control device. The method is described as follows. A controlled device is selected from a plurality of controllable devices. A corresponding operation interface is displayed according to display data corresponding to the selected controlled device. A position image of a hand of a user is analysed according to the processing of the image captured by the image capturing module. A control command input by the user is determined according to the display data and the captured position image of the hand of the user.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 2H and 2I are schematic diagrams of a portable virtual input control device using multiple video cameras to capture images and analysing to obtain a two-dimensional gesture variation.

FIGS. 4A-4I are schematic diagrams illustrating examples of virtual interactions between pointing activities of a finger of a user and a virtual operation interface.

FIG. 5A and FIG. 5B are schematic diagrams respectively illustrating a combined portable virtual input control device and a user wearing the same according to an exemplary embodiment of the disclosure.

FIG. 8 is a schematic diagram illustrating a portable virtual input control device capable of viewing or playing projected pictures or a video in a full screen size.

DETAILED DESCRIPTION OF DISCLOSED EMBODIMENTS

Figure 1A:
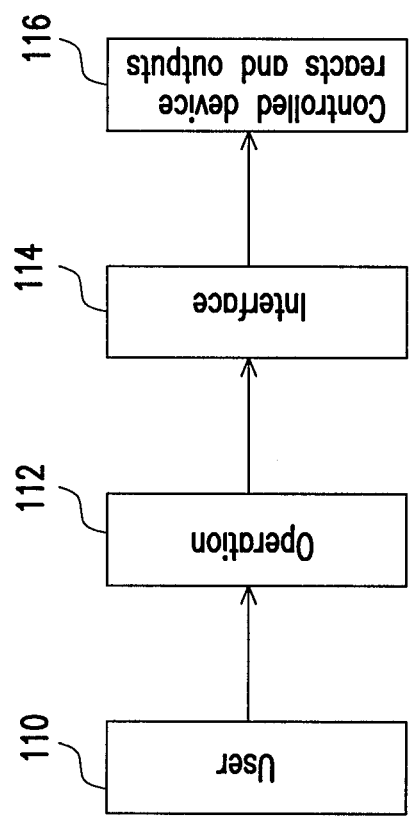
FIG. 1A and FIG. 1B are diagrams respectively illustrating a conventional control method of inputting command and a portable virtual input method provided by an exemplary embodiment of the disclosure.

A portable virtual input control device and an operation method thereof are described below, so as to achieve a convenient human-machine interaction and remote control.

The portable virtual input control device can be a human-machine interaction device, and in an exemplary embodiment, it may correspond to one or a plurality of controllable devices. A user can directly select the controlled device to be controlled, or the controlled device to be controlled is selected through an interactive input performed through user's voice or a virtual interface. Regarding different requirements of different controlled devices, a human-machine operation interface corresponding to the selected controlled device is presented, so that the user can perform virtual interactive input through the operation interface by finger activities. Through such simple operation interface, the user can not only interact with the controlled device but also control a plurality of controllable devices by a single controller, the portable virtual input control device.

In an exemplary embodiment, the portable virtual input control device can also provide responses to the interactive input performed through user's voice or the virtual interface to send a sound, a calculation result or even perform translation, etc.

An exemplary embodiment of the disclosure provides a portable virtual input control device and an operation method thereof to achieve remote control and human-machine interaction. The portable virtual input control device may correspond to at least one or a plurality of controllable devices in a one-to-one or a one-to-many manner, and the user may determine the controlled device to be controlled through the interactive input performed through user's voice or the virtual interface. Regarding different requirements of different controllable devices, a human-machine operation interface corresponding to the selected controlled device is presented, so that the user can perform a virtual interactive input through the operation interface by finger activities. Through such simple operation interface, a purpose of that a single controller used to control at least one controllable electronic device is achieved. Meanwhile, usage complexity of the operation interface is simplified to improve interactivity between the user and the operation interface.

The portable virtual input control device of the exemplary embodiment can be worn by the user, so that the user's role is equivalent to a user interface, and the portable virtual input control device can operate different controllable devices. An operation interface display unit of the portable virtual input control device is located close to user's eyes, and a virtual operation interface corresponding to the controlled device is displayed thereon. The operation interface display unit can be transparent or translucent display with flexibility or non-flexibility, or can be a thin film transparent or translucent electronic circuit film attached on a transparent or translucent lens.

The virtual operation interface is directly imaged on the operation interface display unit, and when the user watches the virtual operation interface displayed by the operation interface display unit, based on a visual projection effect of the user, a projected operation interface image is generated in the distance outside the operation interface display unit which is further than a distance between the operation interface display unit and the user's eyes, so as to facilitate the user to perform operations. An inbuilt video camera of the portable virtual input control device directly captures an image of a hand outside the operation interface display unit, and analyses an interactive position between the finger and the operation interface image to recognize a control command. Then, the control command is transmitted to the controlled device through infrared ray, radio wave, blue tooth or other wireless transmission module. In this way, a purpose of that the single controller used to control at least one or a plurality of controllable devices is achieved, and meanwhile usage complexity of the operation interface is simplified to improve interactivity between the user and the operation interface.

The portable virtual input control device of the exemplary embodiment can be hanged on the head or other body parts of the user, and images of the hand of the user captured by a single video camera or dual video cameras built in the portable virtual input control device can be compared to the virtual operation interface image, so as to obtain a control command selected by the user. Since the portable virtual input control device is hanged on the body of the user, a position of the inbuilt video camera relative to the body of the user is not varied along with a movement of the user, so as to ensure an accurate interaction between the user and the operation interface.

The portable virtual input control device and the method thereof provided by the exemplary embodiment can correspond to a plurality of the controllable devices. The portable virtual input control device can be integrated with other devices and can simplify the displayed operation interface to improve interaction convenience. The interactive input between the user's finger and the visual-projected virtual operation interface may improve an operation intuition, and remote control can be achieved without a physical contact. Moreover, since the portable virtual input control device is portable, usage of the portable virtual input control device is not limited by usage locations.

Figure 1B:
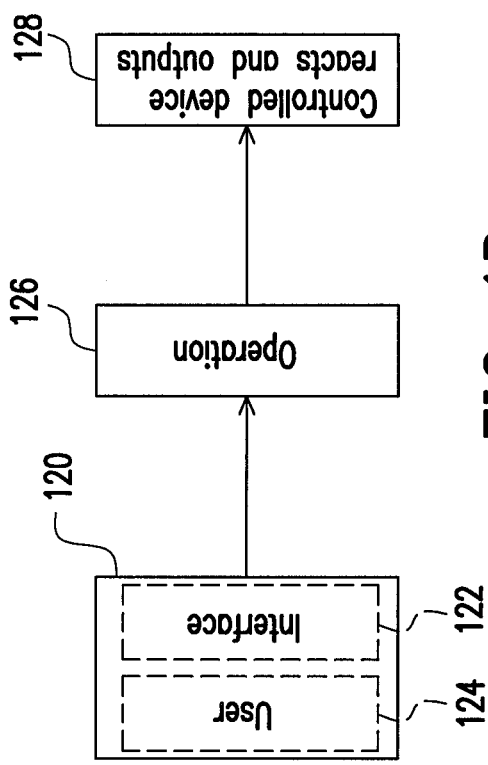

FIG. 1A and FIG. 1B are diagrams respectively illustrating a conventional input method and a portable virtual input method provided by the exemplary embodiment of the disclosure. FIG. 1A illustrates the conventional input and control method, by which when a user (110) performs an operation (112), the user performs an input operation through an interface (114), and a controlled device reacts (116) the input operation of the user. In the operation method provided by the exemplary embodiment, as that shown in FIG. 1B, when a user (120) is about to perform an operation, since the operation device is worn by the user, a user's role (124) is equivalent to a user interface (122), and based on an input operation (126) of the user, a controlled device reacts (128) the input operation of the user. A difference between the two operation methods is that the portable virtual input control device of the exemplary embodiment directly generates the user interface, and input interfaces of different controlled devices can be generated according to instructions, and then the portable virtual input control device directly controls the controlled device to react the input operation of the user without using an interface generated by the controlled device for inputting.

Figure 2A:
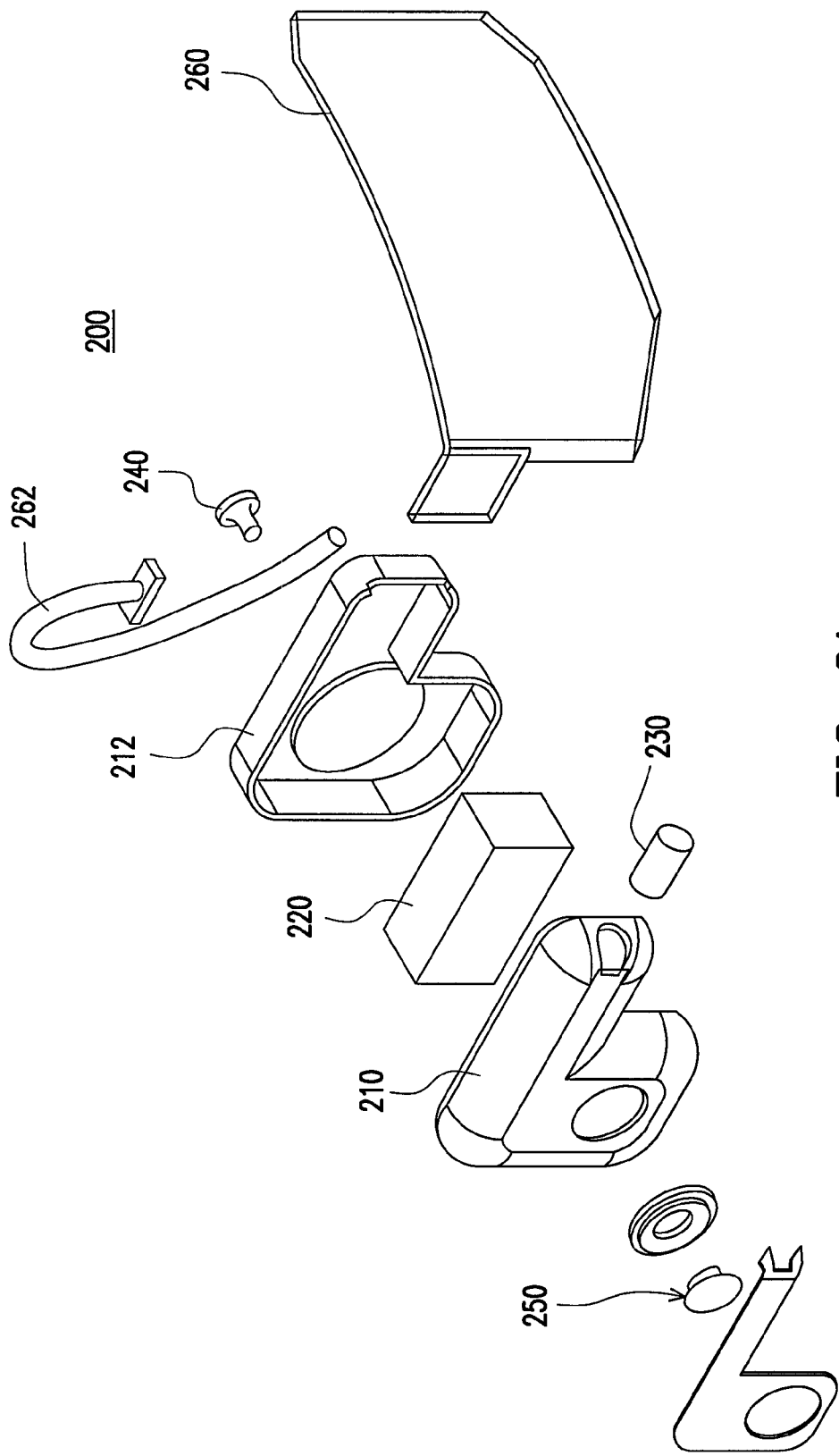
FIG. 2A is an exploded view of components of a portable virtual input control device according to an exemplary embodiment of the disclosure.
Figure 2C:
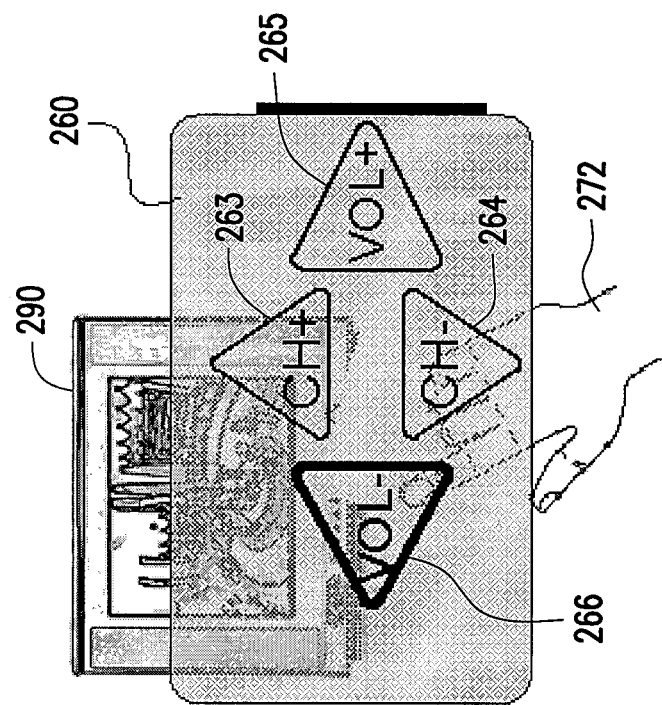
FIG. 2C illustrates a user, in a first person vision, operating a virtual operation interface generated corresponding to a controlled device through a portable virtual input control device of an exemplary embodiment of the disclosure.
Figure 2B:
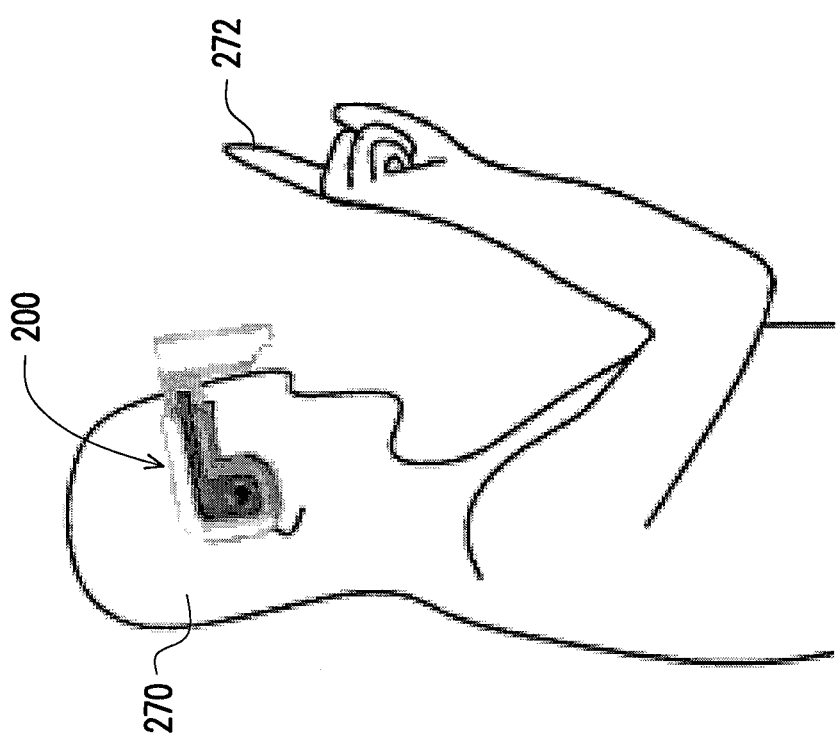
FIG. 2B illustrates a user wearing a portable virtual input control device and performing operations by hand.

FIG. 2A is an exploded view of components of a portable virtual input control device according to an exemplary embodiment of the disclosure, and FIG. 2B illustrates a user wearing the portable virtual input control device and performing operations by hand. Moreover, FIG. 2C illustrates a user operating a virtual operation interface generated corresponding to the controlled device through the portable virtual input control device of the exemplary embodiment.

Referring to FIG. 2A, the portable virtual input control device 200 includes casing main bodies 210 and 212, a central processing module 220, an image capturing module 230 (for example, a video camera), a sound output unit 240 (for example, a earphone), a sound receiving and outputting module 250 and an operation interface display unit 260. The portable virtual input control device 200 can be an ear-hooking device, and is worn by the user on the head through an ear hook 262. If the user wears a pair of glasses or other articles, the portable virtual input control device 200 can also be hanged thereon. As shown in FIG. 2B, the portable virtual input control device 200 can be worn by a user 270, and operation effects thereof can be achieved through position variations of a hand 272 of the user 270.

The operation interface display unit 260 can be a transparent or translucent display with flexibility or non-flexibility, or a thin film transparent or translucent electronic circuit film attached on a transparent or translucent lens. The operation interface display unit 260 outputs an image according to display data transmitted by the central processing module 220.

FIG. 2C illustrates a user operating a virtual operation interface displayed by the operation interface display unit 260 which is generated corresponding to the controlled device. The operation interface display unit 260 displays a plurality of options corresponding to the operations of the controlled device. For example, a television 290 is selected to be controlled, the operation interface display unit 260 displays options 265 and 266 for adjusting a sound volume, and up and down options 263 and 264 for selecting program channels. According to a position variation of the hand 272, for example, the hand 272 stays in a certain option area or a place for a period of time; then, a control command selected by the user 270 can be determined through detection. In another embodiment, the control command selected by the user 270 can be determined according to a motion activity of the hand 272.

The portable virtual input control device 200 is worn by the user 270, and after the user 270 selects the controlled device, the operation interface display unit 260 displays a virtual operation interface corresponding to the selected controlled device. Based on the visual projection effect of the user 270, an operation interface image projected in the distance is generated. The image capturing module 230 (referred to as a video camera hereinafter) built in the portable virtual input control device 200 captures an image of the hand 272 outside the operation interface display unit 260, and analyses an interactive position between the finger of the hand 272 and the virtually projected operation interface image to recognize a control command. Actually, the portable virtual input control device 200 mainly analyses the captured image of the hand 272 and the virtual operation interface displayed on the operation interface display unit 260, though since the user views the virtually projected operation interface image, as long as a distance between the operation interface display unit 260 and the user is obtained, and a relative position the hand 272 of the user in the space is obtained, after the inbuilt video camera module 230 is used to effectively capture the image of the hand 272 outside the operation interface display unit 260 through different focus adjustments, a corresponding control item (for example, the up and down options 263 and 264 (CH+ and CH−) used for choosing the program channels) pointed by the finger of the hand 272 of the user can be determined by analysis.

Figure 2D:
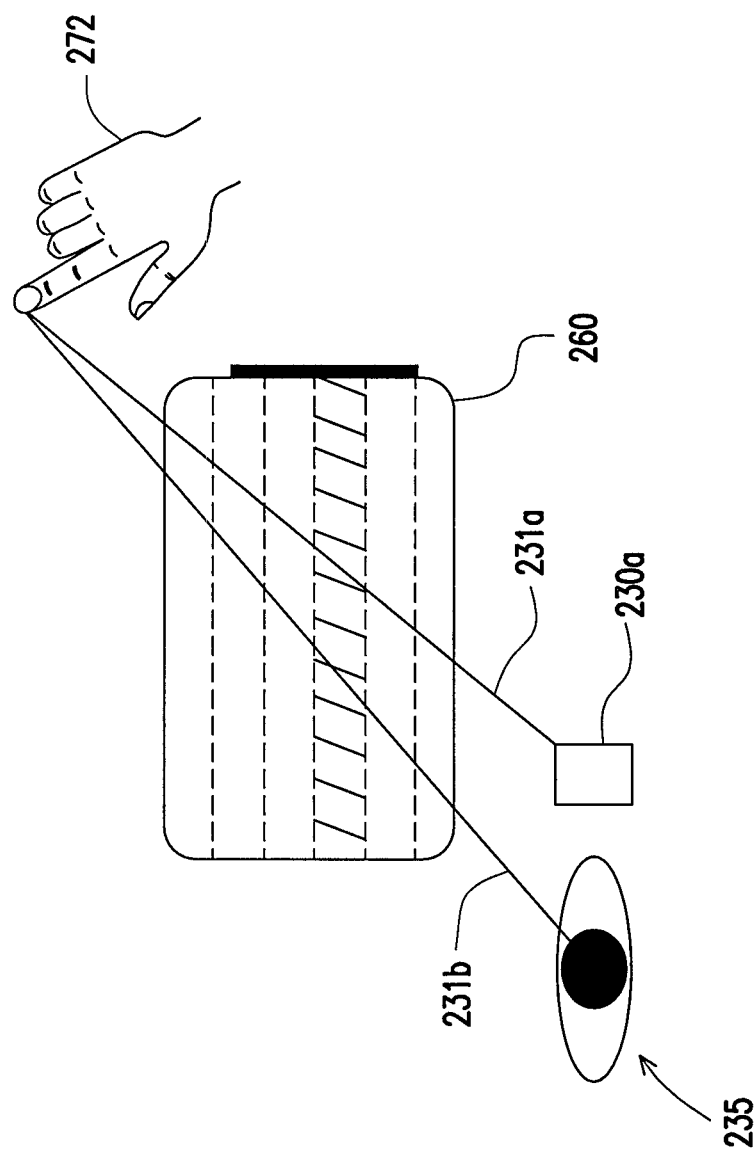
FIGS. 2D-2G illustrate different image capturing methods of a portable virtual input control device according to an exemplary embodiment of the disclosure.

In an exemplary embodiment, if the video camera module 230 is a single video camera 230a as that shown in FIG. 2A and FIG. 2B, the single video camera 230a is located at a side of an eye 235 of the user 270. Referring to FIG. 2D, a vertical relationship of the corresponding control items (for example, the up and down options 263 and 264 (CH+ and CH−) of FIG. 2C) pointed by the hand 272 of the user in the captured image is obtained by analysis according to different optical axes 231a and 231b.

Figure 2E:
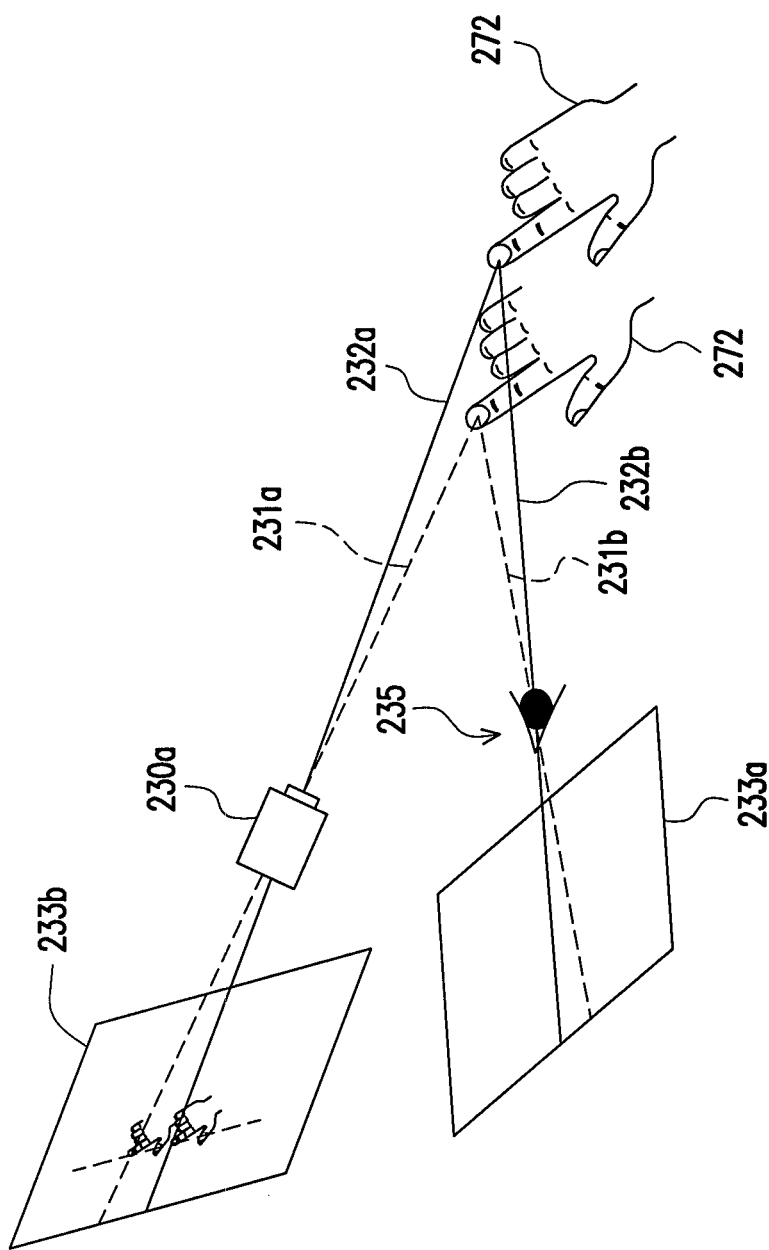

A principle of the above description is shown in FIG. 2E, the single video camera 230a captures an image of an object (for example, the finger of the user) in the space, and a position variation of the object in the space corresponds to imaging positions on an image plane 233b through different optical axes 231a and 232a, while the eye 235 of the user views the position variation of the object in the space on an image plane 233a through different optical axes 231b and 232b, so that position variation information of the object along a single direction can be obtained according to such principle.

Figure 2F:
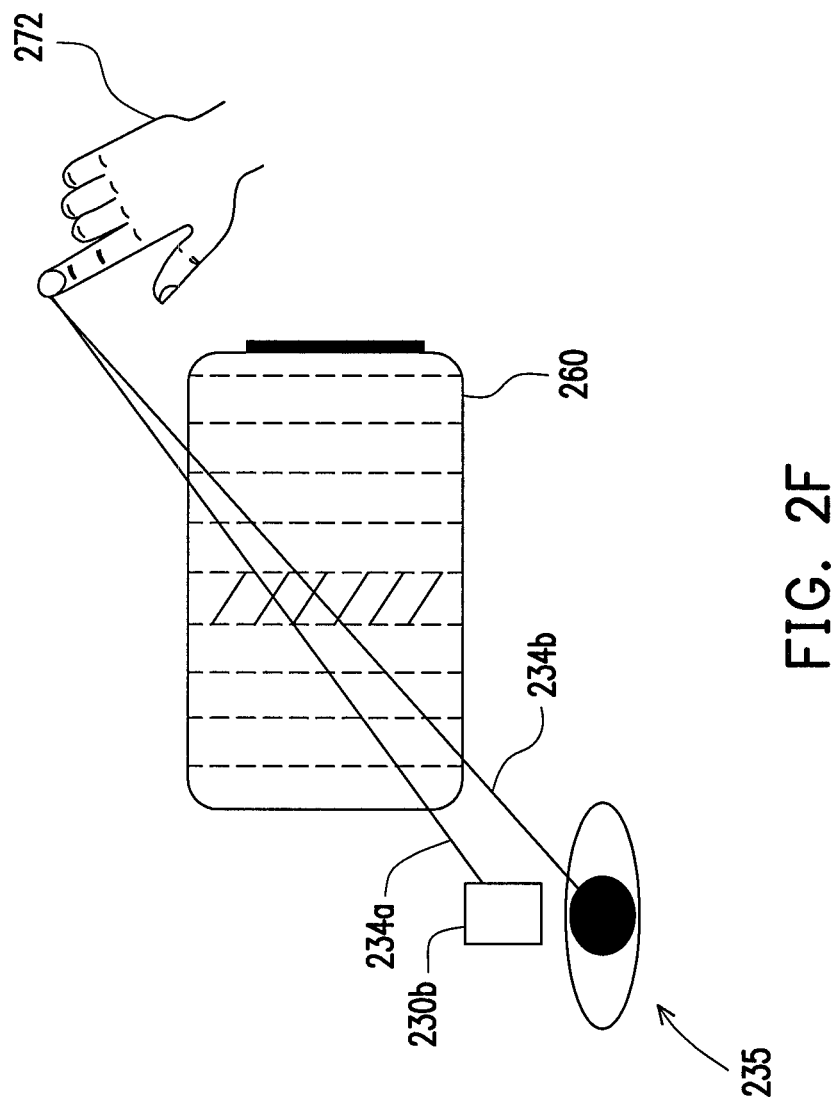

In another exemplary embodiment, referring to FIG. 2F, a single video camera 230b is located above the eye of the user, and a horizontal relationship of the corresponding control items (for example, the options 265 and 266 (VOL− and VOL+) used for adjusting a sound volume) pointed by the hand 272 of the user in the captured image can be obtained through analysis. Therefore, the horizontal relationship of the corresponding control items pointed by the hand 272 of the user in the captured image can be obtained by analysis according to different optical axes 234a and 234b.

Figure 2G:
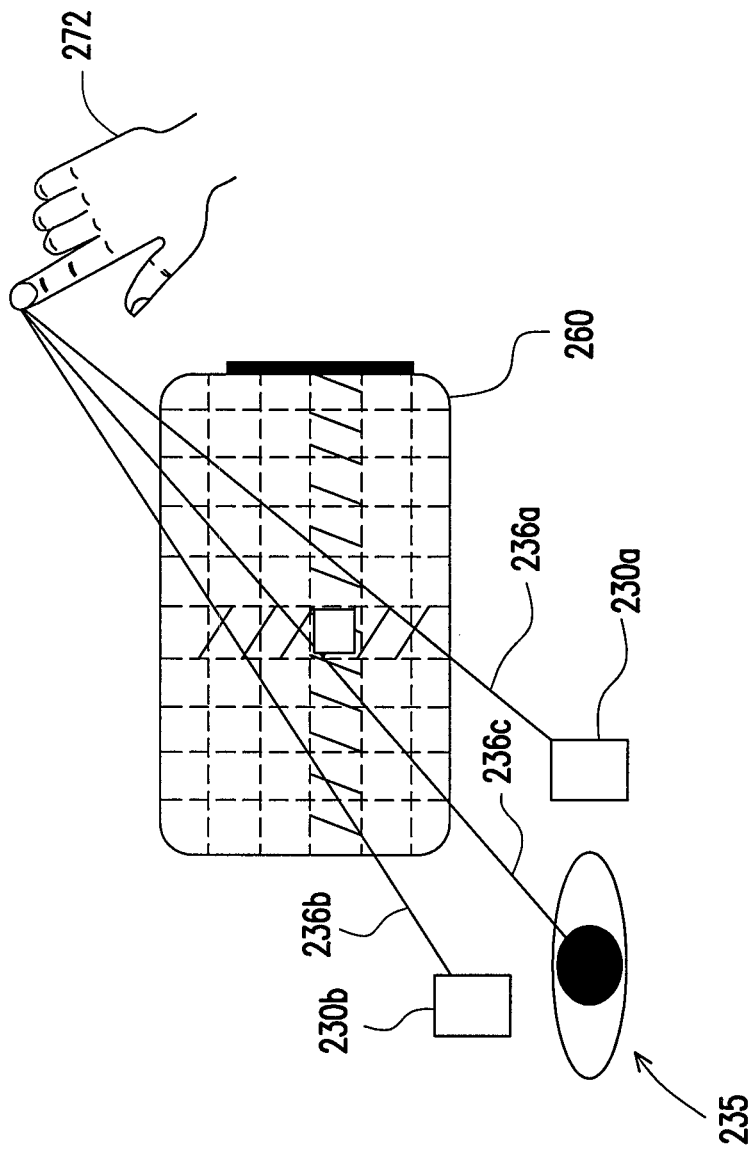

When the operation interface display unit 260 displays a plurality of control items with a relatively complicated two-dimensional relationship, in a plurality of exemplary embodiments, a plurality of video cameras can be used to capture images so as to obtain a two-dimensional gesture variation through analysis. For example, in one of the exemplary embodiments, referring to FIG. 2G, two video cameras 230a and 230b are used to capture images, so as to analyse a position of the hand of the user in the space relative to the control items displayed by the operation interface display unit according to different optical axes 236a, 236b and 236c.

Then, a wireless transmission module connected to the central processing module 220 of the portable virtual input control device 200 wirelessly transmits the control command to the controlled device 290 (for example, the television shown in FIG. 2C) through infrared ray, radio wave, blue tooth or other wireless transmission manners, so that the controlled device correspondingly reacts according to the control command.

Figure 2H:
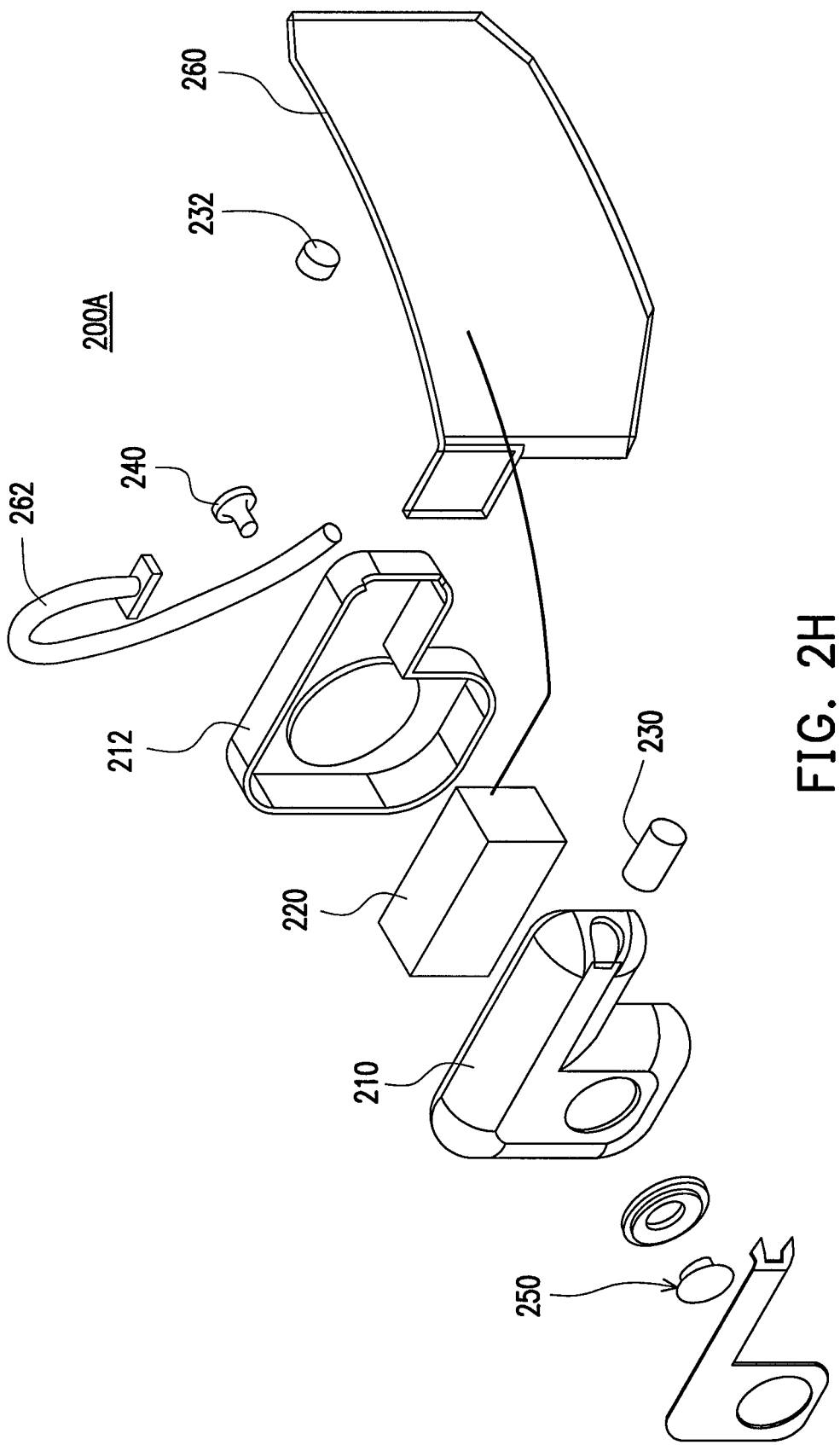
Figure 21:
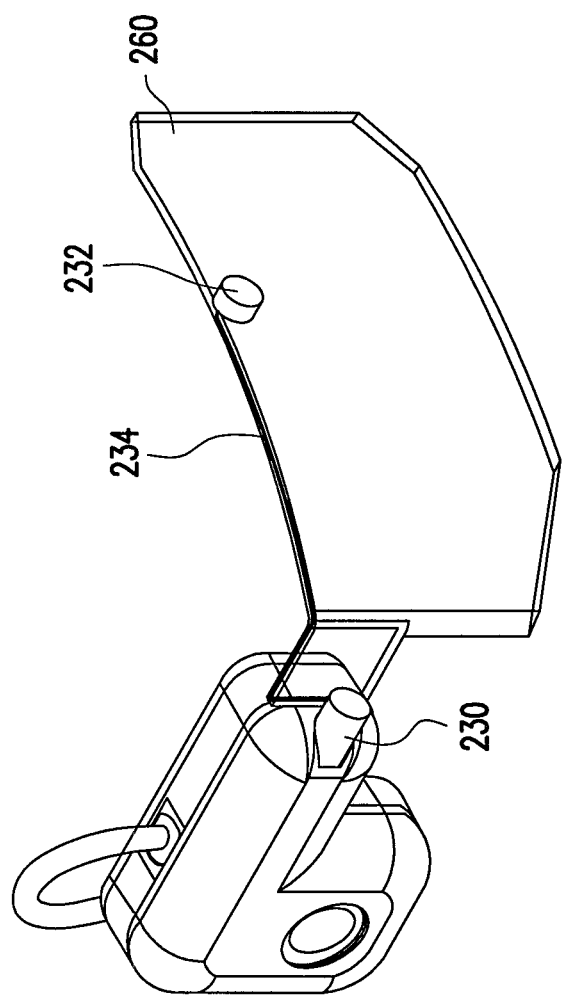

In a plurality of exemplary embodiments, a plurality of video cameras can be used to capture images so as to obtain a two-dimensional gesture variation through analysis, as that shown in FIGS. 2H and 2I. FIG. 2H is an exploded view of components of a portable virtual input control device according to an exemplary embodiment of the disclosure. Referring to FIG. 2H, descriptions of the components in FIG. 2H similar to that of FIG. 2A are not repeated. A difference between the exemplary embodiments of FIG. 2H and FIG. 2A is that besides the inbuilt video camera 230, a video camera 232 is added. FIG. 2I is a combination view of the portable virtual input control device of FIG. 2H, in which a connection line 234 is used to transmit the image captured by the video camera 232 back to the system.

Figure 3:
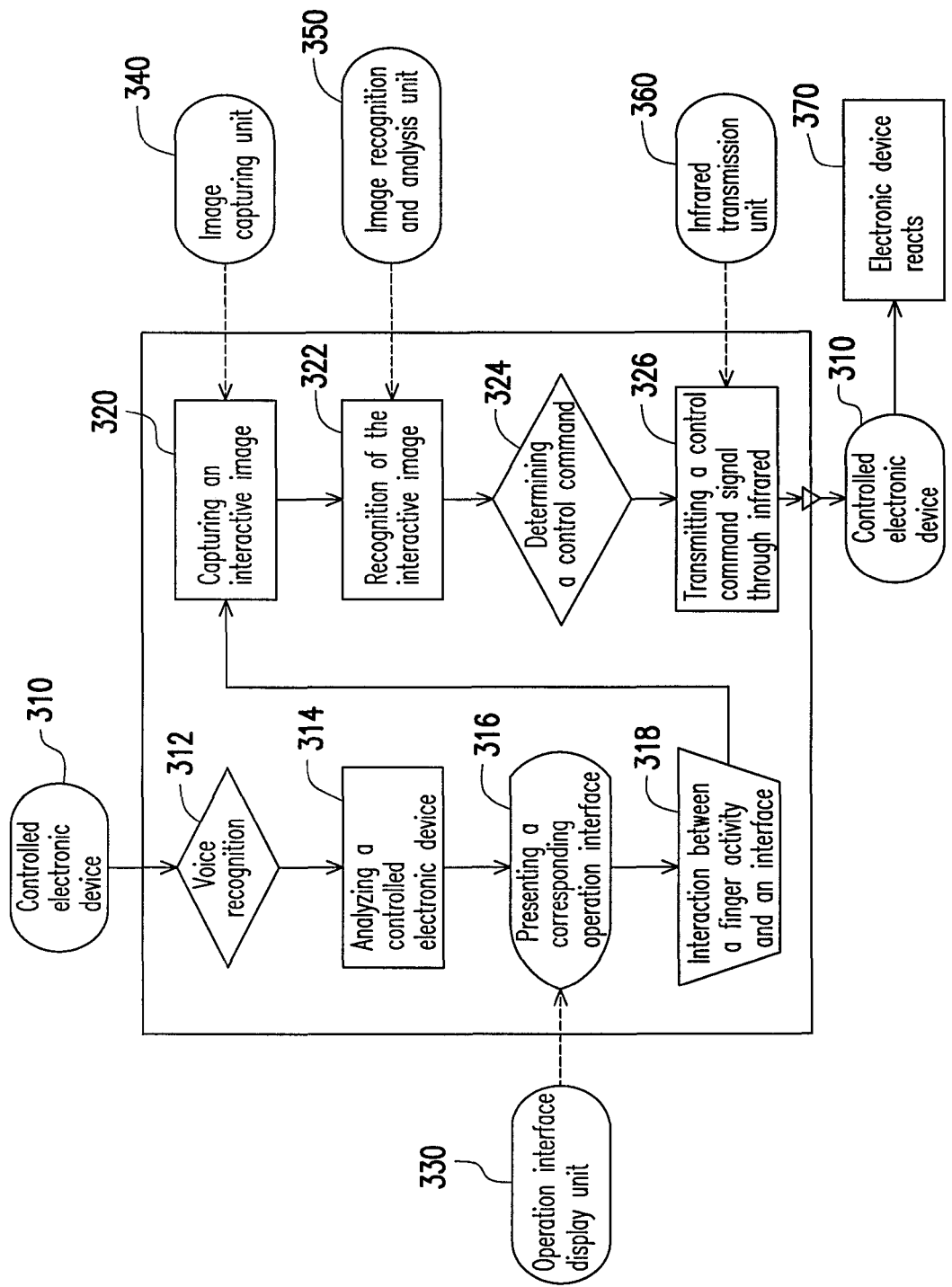
FIG. 3 is a flowchart illustrating a method for operating a portable virtual input control device according to an exemplary embodiment of the disclosure.

FIG. 3 is a flowchart illustrating an operation method of a portable virtual input control device according to an exemplary embodiment of the disclosure. First, in steps 312 and 314, an electronic device to be controlled is selected. In the exemplary embodiment, a plurality of controllable devices is provided, and when one of the controllable electronic devices is about to be operated, voice recognition (step 312) is performed by the central processing module according to a voice input method, so as to determine the controlled device 310 to be operated, and the central processing module analyses a characteristic of the controlled device 310 (step 314) to produce its corresponding control items. In another exemplary embodiment, a menu list of the controllable electronic devices can be produced through a specific voice signal or by pressing a control button on the portable virtual input control device, and then the controlled electronic device 310 can be manually selected by the user.

Then, after the controlled electronic device 310 is selected, a corresponding virtual operation interface is generated to present the corresponding control items (step 316), and these control items are displayed on an operation interface display unit 330 to present an operation interface corresponding to the controlled electronic device 310, so as to facilitate virtual interactions between finger activities of the user's hand outside the operation interface display unit 330 and the operation interface (step 318). Then, an image capturing module 340 (for example, a video camera) captures an image of the finger outside the operation interface display unit 330 (step 320), and transmits the image to the central processing module. After an image recognition and analysis unit 350 analyses the image, a control command corresponding to the control item selected by the finger is determined (step 324).

Finally, a wireless transmission module, for example, an infrared ray transmission unit 360 transmits the control command to the controlled electronic device 310 by infrared (step 326), and the controlled electronic device 310 reacts according to the control command (step 370) to achieve the control operation.

Following FIGS. 4A-4I are schematic diagrams illustrating examples of virtual interactions between pointing activities of the user's finger and the virtual operation interface, which are respectively described in detail below.

FIG. 4A illustrates a virtual operation interface 400 displaying the control of air conditioner 420, for example, item options of "+1" or "−1" for increasing or decreasing a cooling degree or a fan strength. When a finger of a hand 410 of the user points one of the item options, for example, the item option of "−1" for decreasing the strength by 1, the degree of the controlled air conditioner 420 is decreased by 1.

FIG. 4B illustrates the virtual operation interface 400 displaying item options of "CH+" and "CH−" for choosing program channels and "VOL+" or "VOL−" for adjusting a sound volume of a controlled television 421. When the finger of the hand 410 of the user points one of the item options, for example, the item option of "VOL−" for decreasing the sound volume, the sound volume of the controlled television 421 is decreased by 1.

Figure 4C:
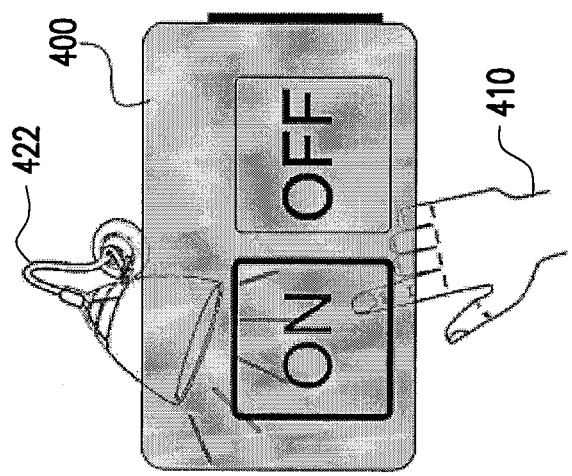
Figure 4D:
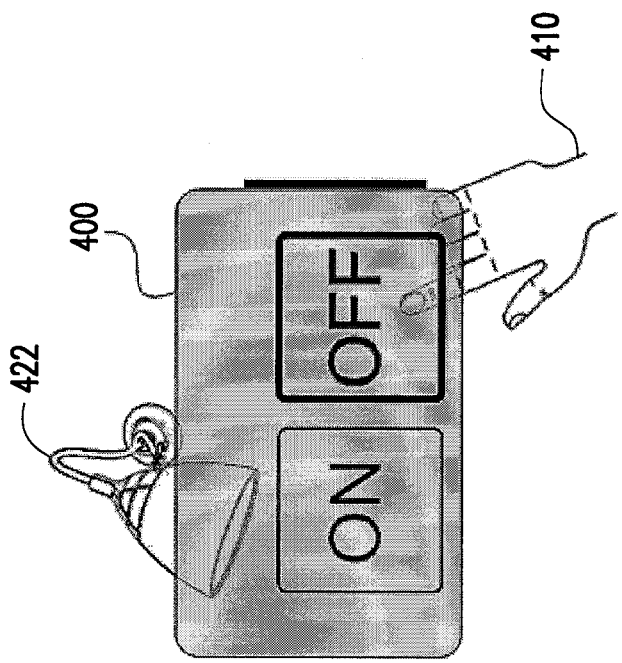

FIG. 4C and FIG. 4D illustrate the virtual operation interface 400 displaying item options of "ON" and "OFF" for turning on and turning off of a controlled lamp 422. When the finger of the hand 410 of the user points one of the item options, for example, the item option of "ON" of FIG. 4C, the corresponding controlled lamp 422 is turned on, and when the finger of the user points the item option of "OFF" of FIG. 4D, the corresponding controlled lamp 422 is turned off.

Figure 4F:
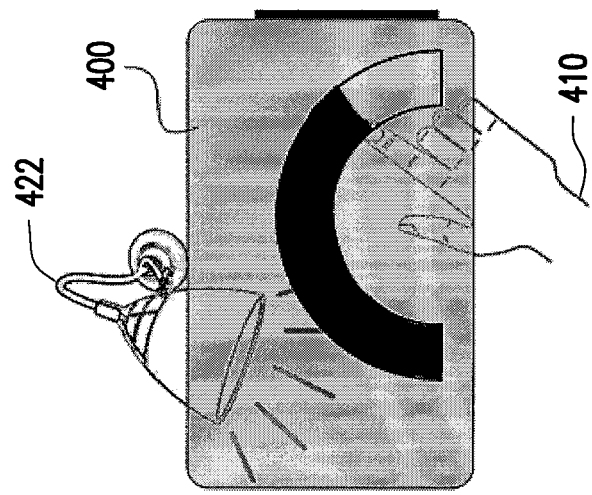
Figure 4E:
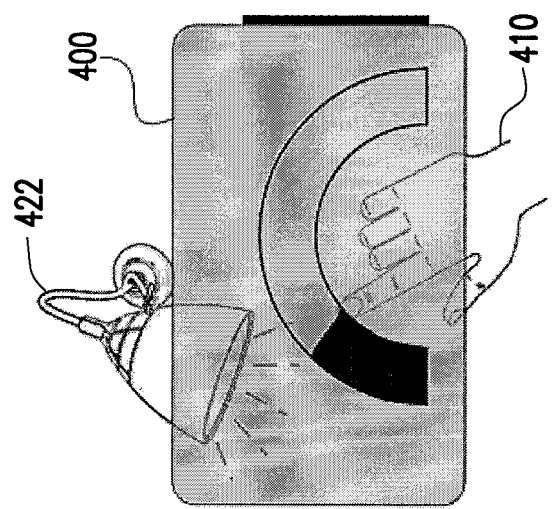

FIG. 4E and FIG. 4F illustrate the virtual operation interface 400 displaying another operation mode (i.e. adjusting an intensity) of the controlled lamp 422. When the finger of the hand 410 of the user draws an arc with a certain radian, the intensity of the controlled lamp 422 is adjusted, for example, the intensity of the controlled lamp 422 is relatively small in FIG. 4E, and relatively large in FIG. 4F.

Figure 4H:
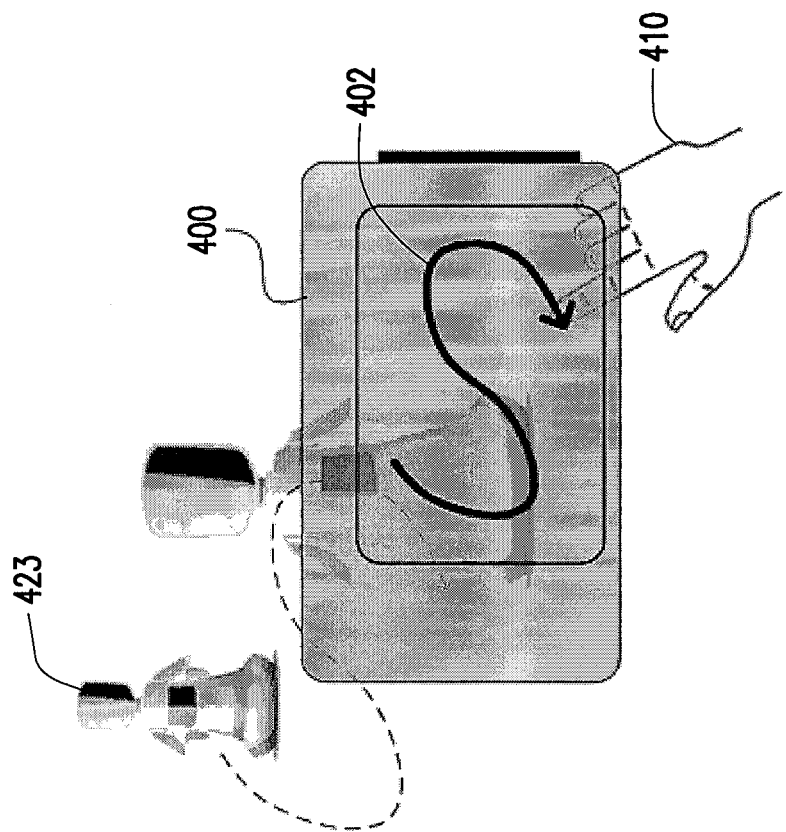
Figure 4G:
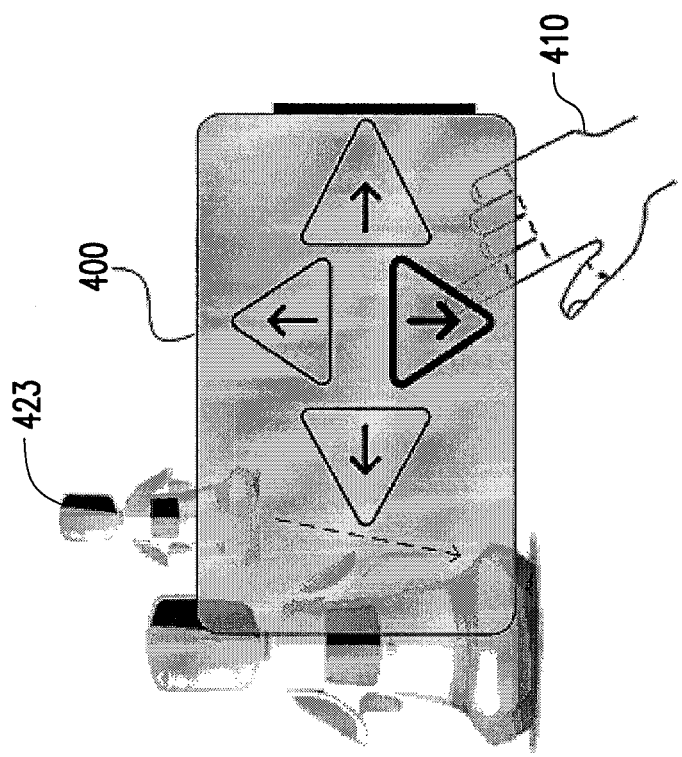
Figure 41:
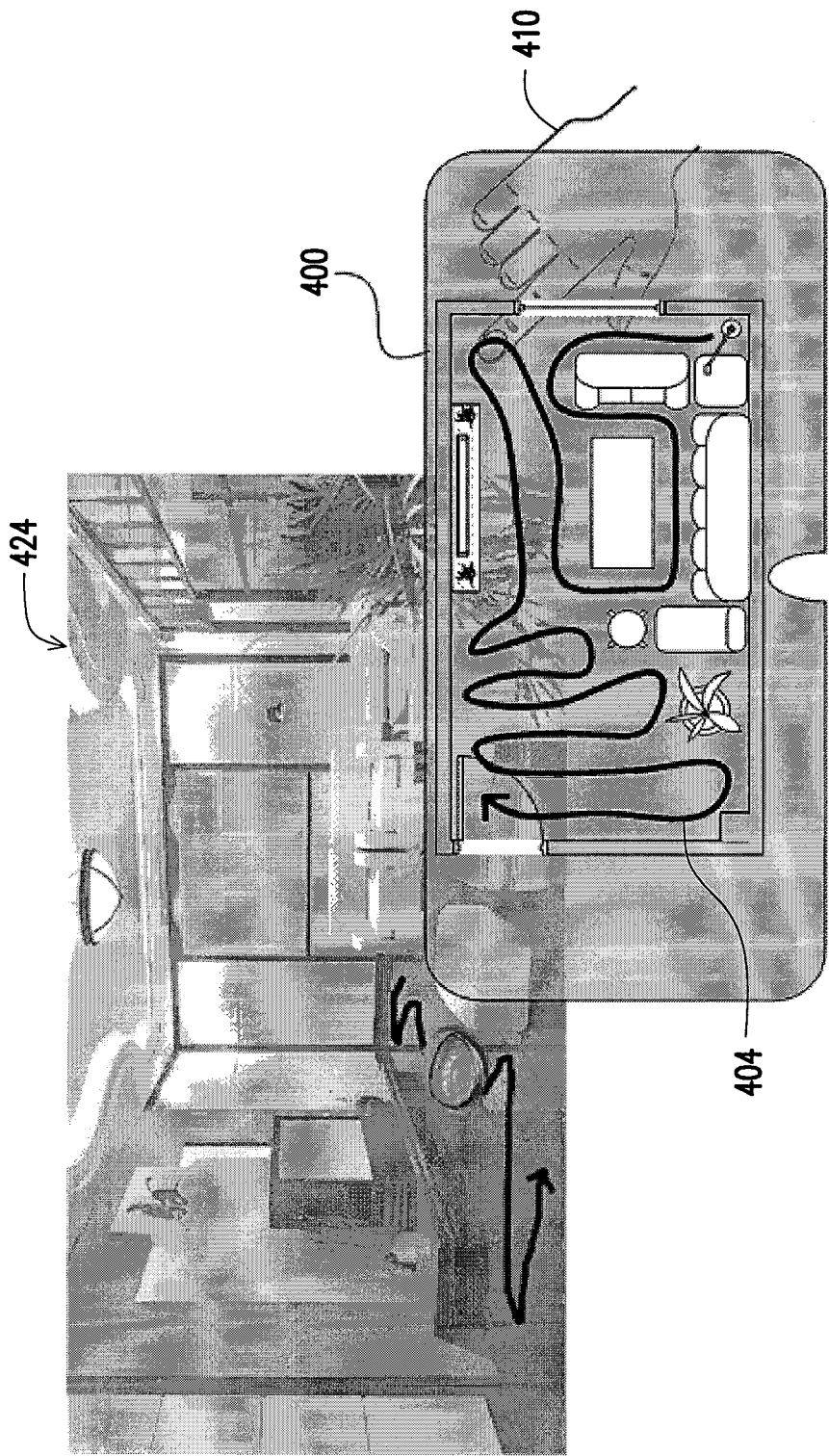

FIG. 4G and FIG. 4H illustrate the virtual operation interface 400 displaying two operation modes of a controlled robot 423, i.e. movement control of the controlled robot 423 in up, down, left and right directions as that shown in FIG. 4G, and movement control of the controlled robot 423 along a curve 402 drawn by the finger of the hand 410 of the user as that shown in FIG. 4H. FIG. 4I illustrate the virtual operation interface 400 displaying movement of a controlled device in a field environment layout 424 along a curve 404 drawn by the finger of the hand 410 of the user.

According to the above examples of virtual interactions between pointing activities of the user's finger and the virtual operation interface shown in FIGS. 4A-4I, systems capable of applying the embodiments of the disclosure are deduced below, though the disclosure is not limited thereto.

1. Integrated Intelligent Home Appliance Control System

An intuitive and convenient control operation of the integrated intelligent home appliance control system can be achieved according to the exemplary embodiment. In the system, each of home appliances, that is, a controllable device, is equipped with a sensing recognition source (a tag or a signal transmitter), and a sensing module (an image sensing device or a signal receiver) of the system is used to recognize one of the home appliances to be operated by the user, and a corresponding control interface of the selected home appliance is displayed on the operation interface display unit, as that shown in FIGS. 4A-4I, and a control signal is opportunely transmitted back to the selected home appliance through a wireless transmission system.

According to the examples of FIGS. 4C-4F, when the system detects that the home appliance to be controlled is a lamp, a switch operation graphics interface of the lamp is displayed on the operation interface display unit 400, and the user's finger is only required to intuitively perform a press action in the space or stay for a period of time in the virtual operation interface, the image capturing module can immediately capture the image of the hand outside the operation interface display unit 400, and transmit the image to the central processing module for analysing the option information, and then an analysing result is transmitted back to the lamp through the wireless transmission module, so as to correspondingly turning on/off the lamp. If the light intensity of the lamp is required to be adjusted, the operation interface display unit 400 can also display a graphics interface corresponding to light intensity adjustment for adjusting. Similarly, the user can intuitively performs operation according to the virtual operation interface displayed in the operation interface display unit 400, and the system can opportunely sense the operation signal to adjust the light intensity of the lamp.

When different home appliances are detected, the system can display the virtual operation interface corresponding to the selected home appliance on the operation interface display unit 400, for example, in FIG. 4A, control items for setting a temperature of the air conditioner are displayed, and in FIG. 4B, control items for adjusting a sound volume and selecting a program channel of the television are displayed.

When a plurality of home appliances are simultaneously detected in an environment, the system can simultaneously display the home appliances in the environment, and an analysis module analyses a most possible home appliance to be operated, while the user can arbitrarily select the home appliance to be operated. The item options displayed in the virtual operation interface can also be selected through a voice receiving device on a sound receiving and outputting module of the system. For example, the user inputs an operation command by voice, and after recognizing of the voice of the operation command, the operation interface display unit displays the controllable devices (home appliances), and the user selects one of the controllable devices to serve as the controlled device. The system of the exemplary embodiment is a portable device, by which the user can freely and intuitively operate all of the home appliances in the environment without being restricted by positions and poses of the user.

2. Operation Control of a Robot

The exemplary embodiment can also be applied in operation control of a robot as that shown in FIG. 4G. The operation interface display unit 400 displays control items of up, down, left and right keys respectively corresponding to movements of backward, forward, leftward and rightward of the robot, so that movement control of the robot can be implemented through the device of the exemplary embodiment according to an intuitive and convenient method. In case of more complicated control items, the operation interface display unit 400 can also display more control items corresponding to detailed actions of the robot such as turning right, turning left, waving and nodding, etc.

As shown in FIG. 4H, the user can draw a moving path of the robot within an operation range displayed on the operation interface display unit 400 by a finger, so that the robot can be controlled to move along a planned trail based on image capturing analysis and warless signal transmission. Such control method can also be applied to plan a cleaning path for a home cleaning robot. In an implementation, an interface display screen in the device of the exemplary embodiment can be expanded to a full-cover display screen, and a distance between the display screen and the eyes of the user can be slightly prolonged to facilitate a clear visual focus of the eyes of the user. When the eyes of the user has a clear focus on the display screen, the operation interface display unit 400 can display a relatively complicated virtual operation interface, for example, an environment map displayed on the operation interface display unit 400 of FIG. 4I. The user can plan the cleaning path for the home cleaning robot on the environment map, and after the home cleaning robot receives the control command, the home cleaning robot can perform home cleaning (for example, vacuuming, mopping the floor, and removing water, etc.) along the cleaning path. Moreover, the path planning method and the movement control of the robot can also be applied to plan a patrol path for a security robot.

FIG. 5A and FIG. 5B are schematic diagrams respectively illustrating a combined portable virtual input control device and a user wearing the same according to an exemplary embodiment of the disclosure. The portable virtual input control device includes a main body 510, a central processing module, an operation interface display unit 520, an image capturing module 530 and a sound output unit (at inner side of the device), and a sound receiving and outputting module 540. The portable virtual input control device can be a head-hanging device, which can be worn on the head of a user 550 through a head cover 560.

When the user 550 wears the portable virtual input control device on the head, the eyes of the user 550 can view the virtual operation interface displayed on the operation interface display unit 520, and the portable virtual input control device can control and operate a plurality of electronic devices in a one-to-more manner. Therefore, a controlled device is selected from a plurality of controllable devices through a voice input and recognition control method. After the controlled device is determined, the central processing module sends an operation interface display command to display a corresponding virtual operation interface on the operation interface display unit 520. Then, the user can perform a non-physical contact interactive input through the virtual operation interface by the finger, and an image of the hand of the user is captured by the image capturing module 530 (for example, a video camera, etc.) for analysis, and then the image with finger position is aligned to the image displayed by the virtual operation interface to analyze a control item pointed by the finger, so as to obtain a control command. Then, a wireless transmission unit transmits the control command to the controlled device, so that the controlled device can react according to the control command.

Figure 6B:
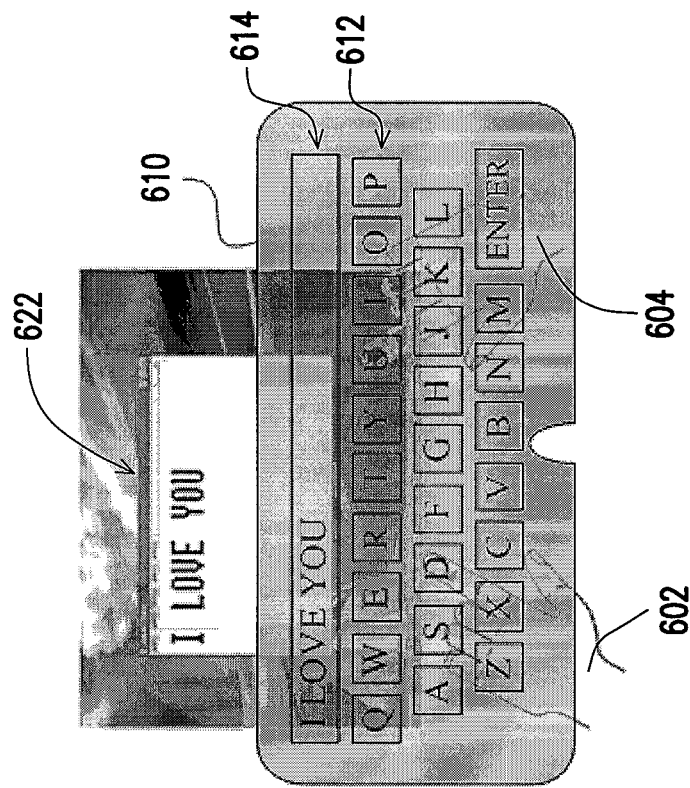
FIGS. 6A-6B are diagrams illustrating examples of using a portable virtual input control device to implement computer operation functions.
Figure 6A:
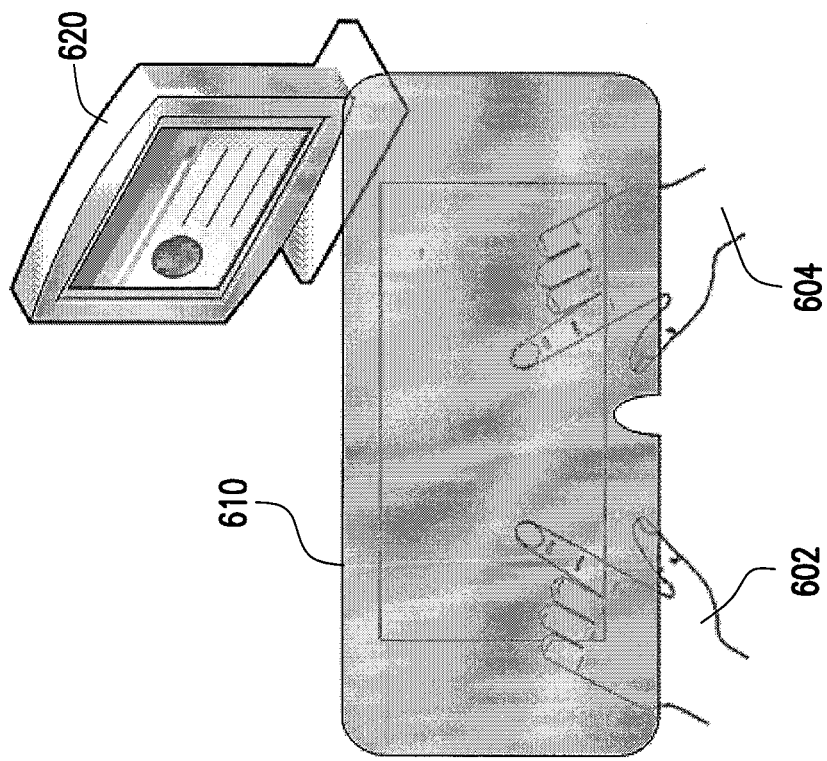

Besides the examples of virtual interactions between the finger activities of the user and the virtual operation interface shown in FIGS. 4A-4I, the portable virtual input control device of the exemplary embodiment can be further applied to implement computer operation functions. As shown in FIG. 6A and FIG. 6B, an input interface such as a computer keyboard, etc. can be displayed on an operation interface display unit 610, and the user can type the virtual operation interface by a left hand 602 and a right hand 604 through a non-physical contacting approach (i.e. the finger intuitively performs press actions in the space or stays for a period of time to determine whether options on the virtual operation interface are pressed) or perform a clicking or a dragging operation to operate a computer 620 to achieve a predetermined function without using an input device such as the computer keyboard, a mouse and a touch panel, etc. In FIG. 6B, an image 612 of the computer keyboard is generated, and after related letters are input, the input letters are displayed on a screen 622 of the computer 620, and meanwhile the corresponding letters are also displayed in a display frame 614 of the operation interface display unit 610. Since the input interface is a virtually projected image, clicking of the virtual operation interface can be implemented by staying the finger in a corresponding region for a predetermined time, which is not implemented by actually clicking the operation interface display unit 610.

Figure 7:
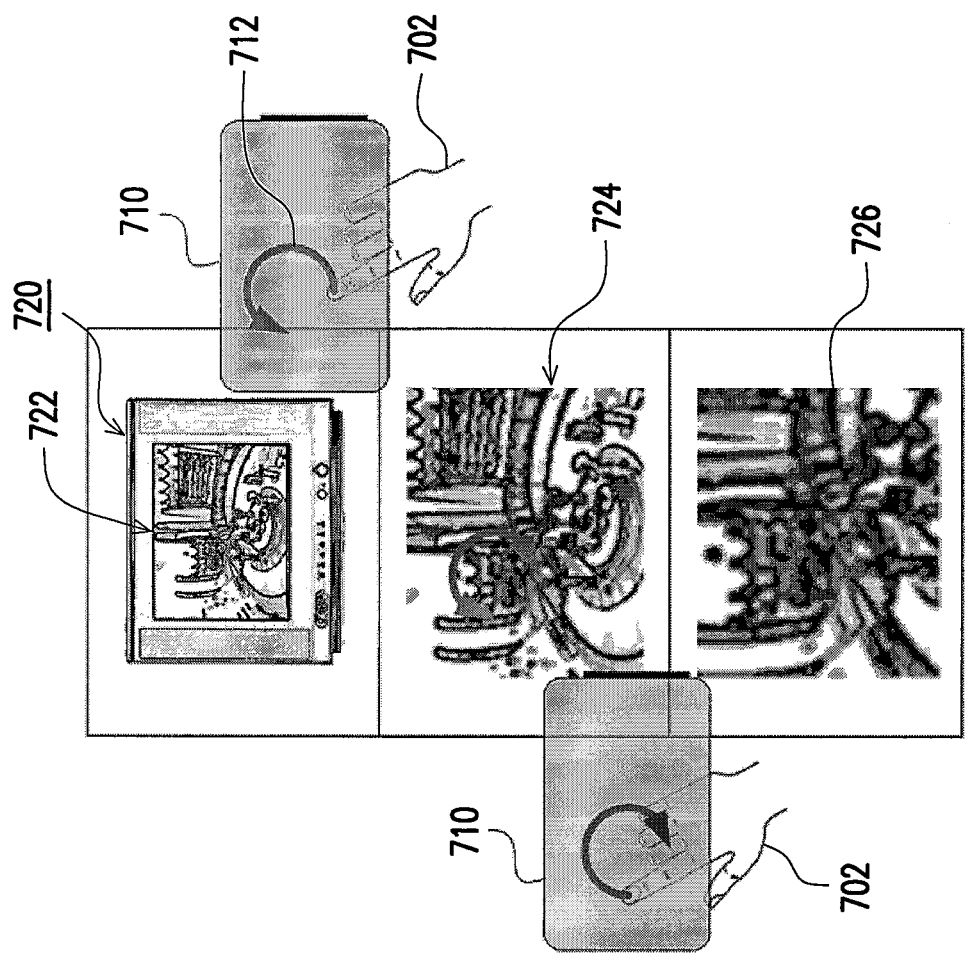
FIG. 7 is a schematic diagram illustrating a portable virtual input control device capable of zooming in/out an image displayed on an operation display unit or a video captured by a video camera.

The portable virtual input control device of the exemplary embodiment can display any position of the virtual operation interface displayed by the operation interface display unit or the image captured by the video camera, for example, any position of the image displayed by a television 720 of FIG. 7, i.e. the operation interface display unit displays any position of the corresponding image. The user can perform a non-physical contact interactive input through an operation interface display unit 710 by the finger of the hand 702. For example, when the finger draws a trail 712 anticlockwise, the image of such region can be zoomed out, for example, an image 724 is converted into an image 722, and when the finger draws a trail clockwise, the image of such region is zoomed in, for example, an image 724 is converted into an image 726. In the portable virtual input control device of the exemplary embodiment, based on the virtual operation interface displayed by the operation interface display unit or the image captured by the video camera, a camera icon button displayed in the virtual operation interface can be clicked by the finger to implement a function of taking a picture, or a video icon button displayed in the virtual operation interface can be clicked by the finger to implement a function of recording video, and if the video icon button is again clicked, the video recording is stopped.

In the portable virtual input control device of the exemplary embodiment, the projected picture or video can be viewed or played in a full screen size, as that shown in FIG. 8. The finger can slide upwards or downwards in the middle of the picture or the video, for example, the finger slides upwards or downwards on a projected image 810, so as to view a previous picture/video or a next picture/video. Moreover, by clicking the picture or the video, the picture or the video can be played in a full screen size, as that shown by images 820, 822 and 824 of FIG. 8.

In an embodiment, the portable virtual input control device of the exemplary embodiment can also react the interactive input performed through the user's voice or the virtual interface to send a sound, a calculation result or even perform translation, etc. For example, FIG. 9A and FIG. 9B are schematic diagrams respectively illustrating an input interface such as a virtual computer keyboard, etc. displayed by an operation interface display unit in which different functions are generated according to user's input.

Figure 9A:
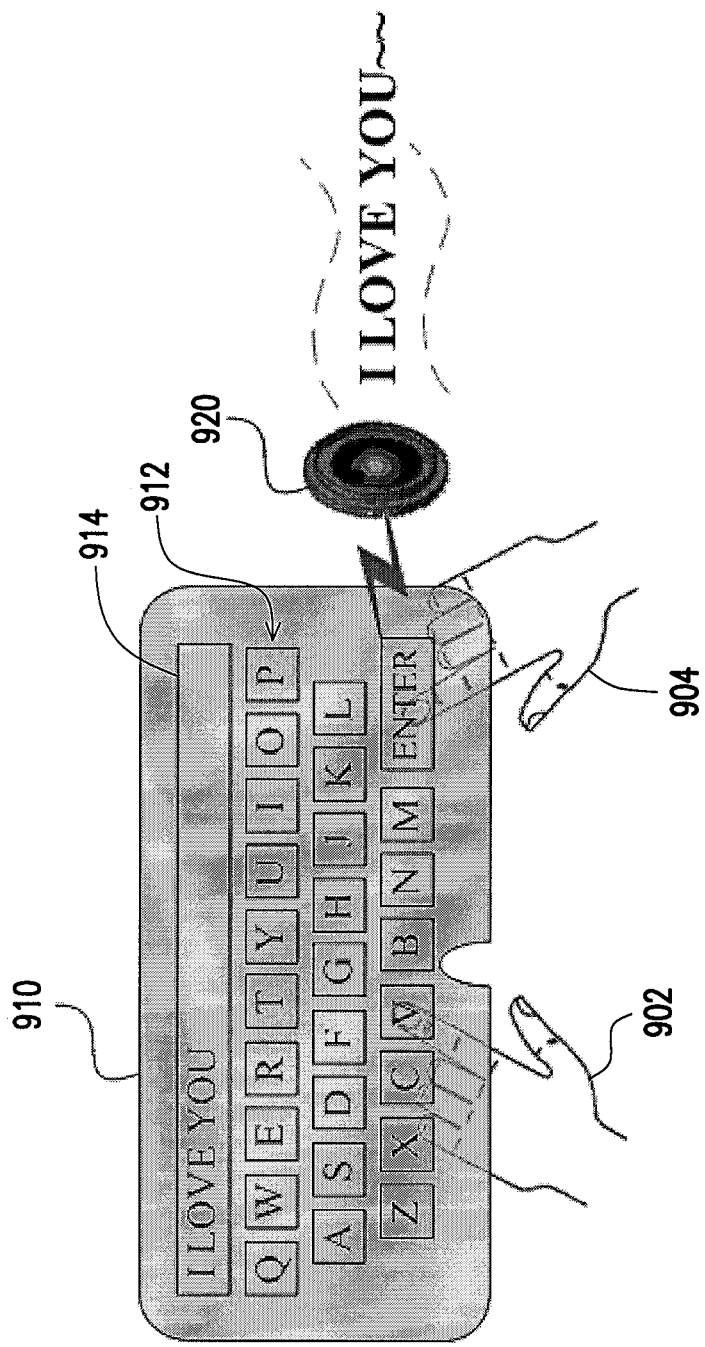
FIG. 9A and FIG. 9B are schematic diagrams respectively illustrating an input interface such as a virtual computer keyboard, etc. displayed by an operation interface display unit in which different functions are generated according to user's input.
Figure 9B:
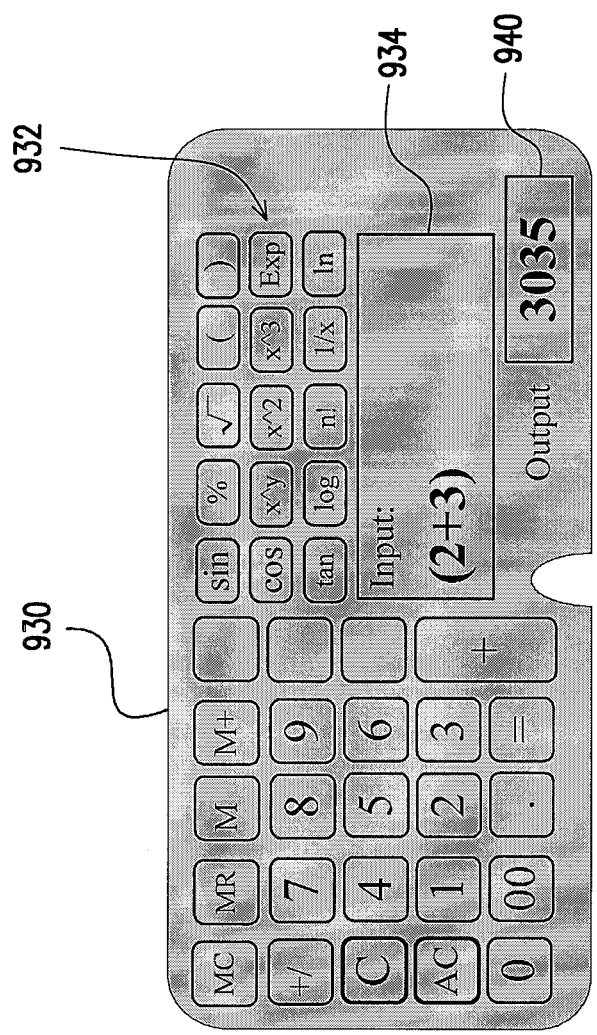

In FIG. 9A, an operation interface display unit 910 displays an input interface such as a virtual computer keyboard 912, and characters input by the user through the virtual computer keyboard 912 displayed by the operation interface display unit 910 are not only displayed on a display frame 914 of the operation interface display unit 910, but are also output in voice through a sound output unit 920 (for example, a earphone, a loud speaker or any output device).

The portable virtual input control device of the exemplary embodiment includes a sound receiving and outputting module (for example, the sound receiving and outputting module 540 built in the main body 510 of FIG. 5), which can implement functions of sending sounds and receiving voices. Therefore, voice from the user or other people can be received by a voice receiving device on the sound receiving and outputting module, and the voice is transmitted to the central processing module for converting into characters, so as to display the characters on the operation interface display unit after a voice recognition process. If the received voice from other users is a language of another nation, the received voice is transmitted to the central processing module for converting into characters, and an automatic translation software can be used to translate the language of the other nation into a native language used by the user, and display on the operation interface display unit. The voice receiving device can further recognize a voice from the user, which can be used to replace the keyboard input interface to directly display the words of the user on the screen.

A sound output unit, located on the main body and connected to the central processing module for producing sound, can broadcast the characters input by the user, or even translate the characters input by the user into other languages for broadcasting. Such device can assist dumb people to communicate with others, or even helps a traveler to translate multiple languages.

In FIG. 9B, an operation interface display unit 930 displays an input interface such as a virtual calculator 932, etc., and after the user inputs numbers through the virtual calculator 932 displayed by the operation interface display unit 930, and selects a computing function, an input expression can be displayed on a display frame 934. Then, a calculation result is displayed on a display frame 940 displayed by the operation interface display unit 930. In an embodiment, the calculation result can also be output by a corresponding voice.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A portable virtual input control device, adapted to be hanged on a body of a user, the portable virtual input control device comprising:
   a main body;
   an operation interface display unit, connected to the main body, and movably disposed in front of a head of the user for displaying an operation interface corresponding to a controlled device, wherein the controlled device is one of a plurality of remote controllable electronic devices;
   an image capturing module, adjacent to the main body, for capturing a position image of a hand of the user outside the operation interface display unit;
   a central processing module, built in the main body, for transmitting display data to the operation interface display unit to display the operation interface, and connected to the image capturing module for receiving the position image of the hand of the user captured by the image capturing module, and determining a control command input by the user according to the display data and the position image of the hand of the user,
   wherein the portable virtual input control device wirelessly controls the plurality of remote controllable electronic devices, and stores at least one interface corresponding to each of the remote controllable electronic devices,
   wherein the at least one interface of the controlled device is displayed on the operation interface display unit to serve as the operation interface, and the controlled device is wirelessly controlled by the portable virtual input control device according to the control command input by user.

2. The portable virtual input control device as claimed in claim 1, further comprising a wireless transmission module connected to the central processing module, for wirelessly transmitting the control command input by the user to the controlled device, so that the controlled device correspondingly reacts according to the control command.

3. The portable virtual input control device as claimed in claim 1, further comprising a sound receiving and outputting module built in the main body, wherein the user selects the remote controllable electronic device to be controlled by voice, and the central processing module correspondingly displays the operation interface of the controlled device after recognizing of the voice.

4. The portable virtual input control device as claimed in claim 1, further comprising a sound receiving and outputting module built in the main body, wherein the user inputs an operation command by voice, and after recognizing of the voice of the operation command, the operation interface display unit displays the remote controllable electronic devices, and the user selects one of the remote controllable electronic devices to serve as the controlled device.

5. The portable virtual input control device as claimed in claim 1, further comprising a sound output unit located on the main body and connected to the central processing module for producing sound.

6. The portable virtual input control device as claimed in claim 1, further comprising a sound receiving and outputting module built in the main body, for receiving voice from the user or other users, and transmitting the voice to the central processing module for converting into characters, so as to display the characters on the operation interface display unit.

7. The portable virtual input control device as claimed in claim 1, further comprising a sound receiving and outputting module built in the main body, for receiving voice from other users, and transmitting the voice to the central processing module for recognition, wherein the central processing module converts the voice into a language used by the user to display on the operation interface display unit.

8. The portable virtual input control device as claimed in claim 2, wherein the control command is wirelessly transmitted to the controlled device through infrared ray, radio wave, blue tooth or other wireless transmission manner.

9. The portable virtual input control device as claimed in claim 1, wherein the operation interface display unit is a transparent or translucent display with flexibility or non-flexibility, or a thin film transparent or translucent electronic circuit film attached on a transparent or translucent lens.

10. The portable virtual input control device as claimed in claim 1, wherein the image capturing module at least comprises a first video camera disposed on the main body and located in a certain distance along a horizontal direction next to an eye of the user, for capturing and analyzing a position variation of the hand of the user along a vertical direction, so as to determine the control command input by the user.

11. The portable virtual input control device as claimed in claim 1, wherein the image capturing module at least comprises a second video camera disposed on the main body and located in a certain distance along a vertical direction above an eye of the user, for capturing and analyzing a position variation of the hand of the user along a horizontal direction, so as to determine the control command input by the user.

12. The portable virtual input control device as claimed in claim 1, wherein the image capturing module comprises a plurality of video cameras disposed on the main body, wherein one of the video cameras is disposed on the main body and located in a certain distance along a horizontal direction next to an eye of the user, and another one of the video cameras is disposed on the main body and located in a certain distance along a vertical direction above the eye of the user, for capturing and analyzing position variations of the hand of the user along a vertical direction and a horizontal direction, so as to determine the control command input by the user.

13. An operation method, adapted to a portable virtual input control device, the operation method comprising:
transmitting display data to an operation interface display unit to display an operation interface of a controlled device;
capturing a position image of a hand of a user outside the operation interface display unit according to an image capturing method;
determining a control command input by the user according to the display data and the captured position image of the hand of the user; and
selecting one of a plurality of remote controllable electronic devices to serve as the controlled device,
wherein the remote controllable electronic devices are controlled in a wireless transmission manner, and storing at least one interface corresponding to each of the remote controllable electronic devices,
wherein the at least one interface corresponding to the controlled device is displayed to serve as the operation interface, and the controlled device is wirelessly controlled by the portable virtual input control device according to the control command input by user.

14. The operation method as claimed in claim 13, a method of selecting one of a plurality of remote controllable electronic devices to serve as the controlled device is that the user selects the controllable device to be controlled by voice, and the operation interface of the controlled device is displayed after recognizing of the voice.

15. The operation method as claimed in claim 13, a method of selecting one of a plurality of remote controllable electronic devices to serve as the controlled device is that the user inputs an operation command by voice, and after recognizing of the voice of the operation command, the devices are displayed the controlled devices, and the user selects one of the remote controllable electronic devices to serve as the controlled device.

16. The operation method as claimed in claim 13, further comprising receiving voice from the user or other users, and converting the voice into characters, and displaying the characters to the user.

17. The operation method as claimed in claim 13, further comprising receiving voice from other users, and converting the voice into a language used by the user for displaying to the user.

18. The operation method as claimed in claim 13, wherein the wireless transmission manner is infrared ray, radio wave or blue tooth.

19. The operation method as claimed in claim 13, wherein the operation interface is a virtual computer keyboard or mouse, and the controlled device is a computer capable of performing a corresponding operation according to input data of the virtual computer keyboard or the mouse.

20. The operation method as claimed in claim 13, wherein the method of capturing the position image of the hand of the user according to the image capturing method comprises:
capturing and analyzing a position variation of the hand of the user along a horizontal direction or a vertical direction, so as to determine the control command input by the user.

21. The operation method as claimed in claim 13, wherein the method of capturing the position image of the hand of the user according to the image capturing method comprises:
capturing and analyzing a position variation of the hand of the user along a horizontal direction and a vertical direction, so as to determine the control command input by the user.

* * * * *